(12) United States Patent
Sawachi

(10) Patent No.: US 7,911,530 B2
(45) Date of Patent: Mar. 22, 2011

(54) DIGITAL CAMERA AND SYSTEM CAPABLE OF SHARING POWER WITH A MOBILE DEVICE

(75) Inventor: Youichi Sawachi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 2282 days.

(21) Appl. No.: 10/183,148

(22) Filed: Jun. 28, 2002

(65) Prior Publication Data

US 2003/0011704 A1  Jan. 16, 2003

(30) Foreign Application Priority Data

Jul. 2, 2001 (JP) .................................. 2001-200638

(51) Int. Cl.
*H04N 5/225* (2006.01)
*G03B 7/26* (2006.01)

(52) U.S. Cl. .................. 348/372; 348/374; 396/303

(58) Field of Classification Search ............... 348/372, 348/374
See application file for complete search history.

(56) References Cited

U.S. PATENT DOCUMENTS

| | | | | |
|---|---|---|---|---|
| 4,994,846 A * | 2/1991 | Kobayashi et al. | ........... | 396/203 |
| 5,895,128 A * | 4/1999 | Kishimoto et al. | ........... | 396/61 |
| 6,151,652 A * | 11/2000 | Kondo et al. | ........... | 713/300 |
| 6,191,814 B1 * | 2/2001 | Elberbaum | ........... | 348/211.14 |
| 6,327,001 B1 * | 12/2001 | Yamagishi | ........... | 348/552 |
| 6,339,264 B1 * | 1/2002 | Wang | ........... | 307/132 E |
| 6,369,561 B1 * | 4/2002 | Pappalardo et al. | ........... | 323/285 |
| 6,377,301 B1 * | 4/2002 | Hieda | ........... | 348/231.99 |
| 6,526,516 B1 * | 2/2003 | Ishikawa et al. | ........... | 713/340 |
| 6,580,460 B1 * | 6/2003 | Takahashi et al. | ........... | 348/372 |
| 6,607,316 B1 * | 8/2003 | Petteruti et al. | ........... | 400/82 |
| 6,720,999 B1 * | 4/2004 | Holberg et al. | ........... | 348/222.1 |
| 6,735,640 B1 * | 5/2004 | Kawabe | ........... | 710/14 |
| 6,753,921 B1 * | 6/2004 | Shimizu | ........... | 348/372 |

(Continued)

FOREIGN PATENT DOCUMENTS

JP   04-013388 A   1/1992

(Continued)

OTHER PUBLICATIONS

Questioning, Apr. 9, 2010, issued in corresponding Japanese Application No. 2001-200638, 6 pages in English and Japanese, English language translation.

*Primary Examiner* — Sinh Tran
*Assistant Examiner* — Hung H Lam
(74) *Attorney, Agent, or Firm* — Sughrue Mion, PLLC

(57) ABSTRACT

In the digital camera that can be used in connection to a mobile phone or other mobile electronic devices and the system thereof, a battery mounted in each device is shared to allow power to be supplied between the devices, and allow both devices to be used for longer hours. The digital camera and the mobile phone are electrically connectable by a connection cable. Generally, a power supply selection switch is set to A, and a power supply selection switch is set to D. The digital camera receives power supplied from a battery, and the mobile phone receives power supplied form a battery. From this state, when the power supply selection switch is switched to C, power is supplied from the battery to the mobile phone. On the other hand, when the power supply selection switch is set to B, and the power supply selection switch is set to D, power is supplied from the battery of the mobile phone to the digital camera.

11 Claims, 8 Drawing Sheets

U.S. PATENT DOCUMENTS

| | | |
|---|---|---|
| 7,113,216 B2 * | 9/2006 | Yoshida .................. 348/333.13 |
| 2002/0013161 A1 * | 1/2002 | Schaeffer et al. ............. 455/557 |
| 2002/0158962 A1 * | 10/2002 | Ishikawa ...................... 347/215 |
| 2005/0225624 A1 * | 10/2005 | Silverbrook ................. 347/109 |

FOREIGN PATENT DOCUMENTS

| | | | |
|---|---|---|---|
| JP | 4256047 | | 9/1992 |
| JP | 06-178178 A | | 6/1994 |
| JP | 09-219806 A | | 8/1997 |
| JP | 09-244124 | * | 9/1997 |
| JP | 10-243327 A | | 9/1998 |
| JP | 2000-184264 A | | 6/2000 |
| JP | 2000-197161 | | 7/2000 |
| JP | 2000-338579 | * | 8/2000 |
| JP | 3074054 | | 10/2000 |
| JP | 2001-005566 A | | 1/2001 |

\* cited by examiner

DIGITAL CAMERA AND SYSTEM CAPABLE OF SHARING POWER WITH A MOBILE DEVICE

BACKGROUND OF THE INVENTION

1. Field of the Invention

The present invention relates to a digital camera and a system thereof, and more particularly to a digital camera and a system thereof that can be used in connection to a mobile electronic device such as a mobile phone or a Personal Digital Assistant (PDA).

2. Description of the Related Art

Systems have been proposed which allow a mobile phone and a digital camera to be used in connection to each other (Japanese Utility Model Registration No. 3074054, Japanese Patent Application Publication No. 2000-197161). In these systems, a battery is mounted to each of the mobile phone and the digital camera, and power is separately supplied. A digital camera of a plug connection type disclosed in Japanese Utility Model Registration No. 3074054 has no battery, and power for the camera is supplied from a mobile phone.

However, in the conventional systems, if the battery of either the mobile phone or the digital camera is drained and cannot supply necessary power, the device naturally cannot be used.

SUMMARY OF THE INVENTION

The present invention is achieved in view of the above, and has an object to provide a digital camera and a system of the same that can be used in connection to a mobile phone or other mobile electronic devices, wherein even if a battery of either the mobile phone or the digital camera is drained, a power supply is shared to allow use of both devices.

In order to attain the above described object, the present invention is directed to a digital camera connectable to a mobile electronic device capable of being driven by a battery, the digital camera comprising: a first battery which provides a supply source of power necessary to operate the digital camera; a connecting unit which electrically connects to the mobile electronic device; a power input terminal which receives power supplied from a second battery mounted in the mobile electronic device connected via the connecting unit; and a power supply selection device which selectively switches a power supply such that power is supplied from one of the first battery and the second battery.

According to the present invention, the digital camera is connectable to the mobile electronic device via the connecting unit. When the first battery mounted in the digital camera is drained and cannot drive the camera, a power supply source is switched by a power supply selection device, and power is supplied from the second battery of the mobile electronic device to the digital camera. This allows the digital camera to operate. The power supply selection device may be a selection device which can be manually operated, or may be a selection device which is automatically switched by a control signal.

Preferably, the digital camera further comprises a power output terminal capable of supplying power from the second battery to the mobile electronic device connected via the connecting unit. Thus, the digital camera and the mobile electronic device can share their batteries with each other, so that the digital camera and the mobile electronic device can be generally operated by their respective batteries independently, but when one of the batteries is drained, power is supplied from the other battery to allow operation.

The present invention is also directed to a digital camera connectable to a mobile electronic device capable of being driven by a battery, the digital camera comprising: a battery which provides a supply source of power necessary to operate the digital camera; a connecting unit which electrically connects to the mobile electronic device; and a power output terminal capable of supplying power from the battery mounted in the digital camera to the mobile electronic device connected via the connecting unit.

According to the present invention, the digital camera is connectable to the mobile electronic device via the connecting unit. When the battery mounted in the mobile electronic device is drained to prevent the mobile electronic device from being used, the digital camera is connected to the mobile electronic device, thus allowing power to be supplied from the battery of the digital camera to the mobile electronic device. This allows the mobile electronic device to operate.

Preferably, the connecting unit is also used as a remote control connecting unit to which a remote control device is connected.

Preferably, the digital camera further comprises: a detecting device which detects the power supply selected by the power supply selection device; and a control device which operates to reduce power consumption of the digital camera when the detecting device detects a state where the power is supplied from the second battery to the digital camera.

Preferably, as the operation to reduce the power consumption of the digital camera, the control device performs at least one of operations comprising supplying power to an image display device, stopping supplying power to a flash circuit, and reducing a clock operation frequency.

Preferably, the control device supplies power to an image pickup circuit system only when the detecting device detects the state where the power is supplied from the second battery to the digital camera and the digital camera is set to an image-capturing mode.

The image pickup circuit system includes an image pickup device which converts an optical image to an electric signal, and an analog signal processing circuit which performs sampling, color separation, and gain control, of an image signal output from the image pickup device.

Preferably, the digital camera further comprises a communication device which sends power supply switching information to the mobile electronic device when the detecting device detects the state where the power is supplied from the second battery to the digital camera.

Preferably, the digital camera further comprises: a battery remaining amount determining device which determines remaining amount of the first battery; and a power supply switching control device which automatically controls switching the first power supply selection device such that power is supplied from the second battery when the battery remaining amount determining device determines that the remaining amount of the first battery is below a predetermined reference value.

The present invention is also directed to a digital camera system capable of transferring image data by connecting a mobile electronic device capable of being driven by a battery and a digital camera, wherein: the digital camera comprises: a first battery which provides a supply source of power necessary to operate the digital camera; a first connecting unit which electrically connects to the mobile electronic device; a first power input terminal which receives power supplied from a second battery mounted in the mobile electronic device connected via the first connecting unit; a first power supply selection device which selectively switches a power supply such that power is supplied from one of the first battery and the second battery; and a first power output terminal capable of supplying power from the first battery to the mobile electronic device connected via the first connecting unit; the mobile electronic device comprises: a second battery which provides a supply source of power necessary to operate the mobile device; a second connecting unit which electrically connects to the digital camera; a second power input terminal which receives power supplied from the first battery mounted in the digital camera connected via the second connecting unit; a second power supply selection device which selectively switches a power supply such that power is supplied from one of the first battery and the second battery; and a second power output terminal capable of supplying power from the second battery to the digital camera connected via the second connecting unit; and the first connecting unit and the second connecting unit are used so that the first power input terminal and the second power output terminal are connected and the first power output terminal and the second power input terminal are connected to allow power to be supplied between the digital camera and the mobile electronic device.

According to the present invention, in the system where the mobile electronic device and the digital camera are connectable, both power supplies can be shared, so that if one of the batteries is drained, power is supplied from the other battery to allow operation.

Preferably, a circuit is configured such that the first battery and the second battery are not electrically connected to each other in any setting states of the first power supply selection device and the second power supply selection device.

Preferably, the digital camera further comprises: a detecting device which detects the power supply selected by the first power supply selection device; a first control device which operates to reduce power consumption of the digital camera when the detecting device detects a state where the power is supplied from the second battery to the digital camera; and a communication device which sends power supply switching information to the mobile electronic device when the detecting device detects the state where the power is supplied from the second battery to the digital camera; and the mobile electronic device further comprises: a second control device which operates to reduce power consumption of the mobile electronic device based on the power supply switching information sent from the digital camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Now, preferred embodiments of a digital camera and a system of the same according to the invention will be described with reference to the accompanying drawings.

Figure 1:
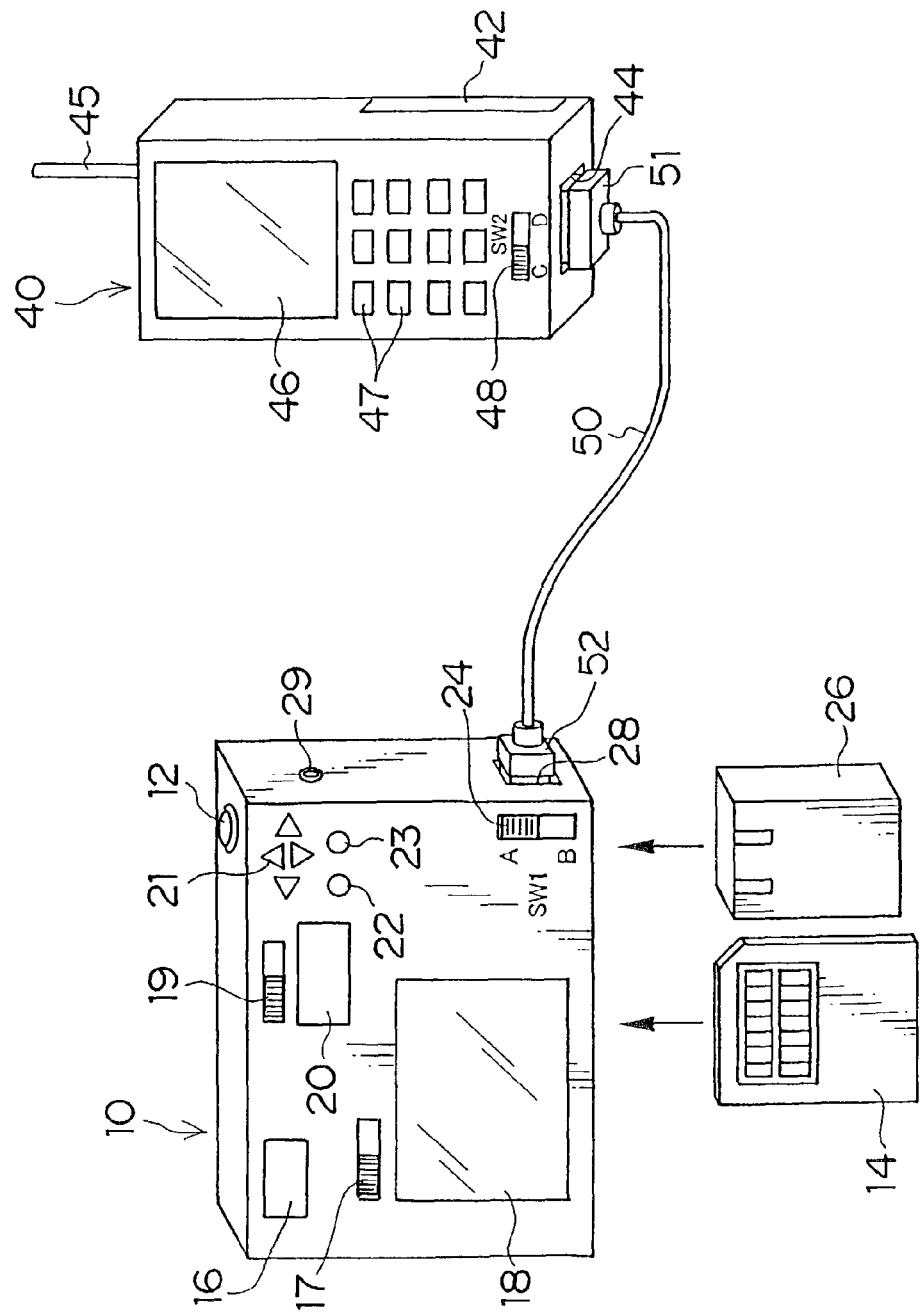
FIG. 1 shows a connection state between a digital camera and a mobile phone according to an embodiment of the invention.

FIG. 1 shows a connection state between a digital camera and a mobile phone according to an embodiment of the invention. A digital camera 10 has a shutter-release button 12 on its top, and image data taken in accordance with pressing the shutter-release button 12 is recorded in a recording medium such as a memory card 14. For the recording medium, various media can be used such as SmartMedia (Solid-State Floppy Disk Card), a PC card, CompactFlash, a magnetic disk, an optical disk, a magneto-optical disk, or Memory Stick. A signal processing device and a media interface in accordance with a medium to be used are applied. Not only a removable medium, but also a recording medium included in the digital camera 10 (internal memory) may be used.

The camera has, on its rear, a finder 16, a power supply switch 17, a liquid crystal monitor (LCD) 18, a mode selection switch 19, a display panel 20, a cross button 21, a menu/enter button 22, a cancel button 23, and a power supply selection switch 24 (SW 1). The power supply switch 17 is an operating unit for turning on/off a main power supply of the digital camera 10. The mode selection switch 19 is a mode setting device which can be selectively switched between an image-capturing mode and a reproduction mode. The display panel 20 includes a small liquid crystal display which mainly displays texts or simple symbols such as mode information or the number of possible images to be captured.

The cross button 21 is a multifunction operating unit which can input instructions of four directions: left, right, top, and bottom. A left key functions as a one frame reversing button, a right key functions as a one frame forwarding button in playback mode, and a top key and a bottom key are used as zoom keys for adjusting zoom in a playback zoom function or an electronic zoom function in image-capturing. The cross button 21 also function as an operation button for selecting menu items from a menu screen displayed by pressing the menu/enter button 22 and for instructing to select various setting items in each menu. The menu/enter button 22 is used when moving from a normal screen to a menu screen in each mode, or when confirming selection contents, instructing to perform (confirm) processing, or the like. The cancel button 23 is used when canceling an item selected from the menu, or returning to a previous operation state.

The liquid crystal monitor 18 can be used as an electronic finder for confirming an angle of view in image-capturing, and display a preview of a captured image or a reproduced image read from the memory card 14. Selecting the menu by the cross button 21 and setting the various setting items are performed using a display screen of the liquid crystal monitor 18. Further, the liquid crystal monitor 18 displays information such as the number of possible frames to be captured (for moving images, possible hours for image-capturing), a number of a reproduced frame, presence or absence of flash firing, macro mode, recording quality, or the number of pixels.

The camera has, on its bottom, a media slot (not shown) into which the memory card 14 is inserted, and a battery insert port (not shown) into which a battery 26 is inserted. Generally, the power supply selection switch 24 of the digital camera 10 is set to A, and the digital camera 10 receives power supplied from the battery 26, but switching the power supply selection switch 24 to B as required allows the digital camera 10 to receive power from a battery 42 of a mobile phone 40.

The camera has, on its side, a connector 28 which electrically connects to the mobile phone 40, and a voice output terminal (earphone jack) 29.

The mobile phone 40 also has a connector 44 which electrically connects to the digital camera 10, and one plug 51 of a connection cable 50 is inserted into the connector 44 of the mobile phone 40, and the other plug 52 is inserted into the connector 28 of the digital camera 10, thereby providing electrical connection between the digital camera 10 and the mobile phone 40 via the connection cable 50.

The mobile phone 40 has an antenna 45, a liquid crystal display unit 46, an operation key 47, and a power supply selection switch 48 (SW2), and the rechargeable battery 42 is mounted to its rear. Generally, the power supply selection switch 48 of the mobile phone 40 is set to D, and the mobile phone 40 receives power supplied from the battery 42, but switching the power supply selection switch 48 to C as required allows the mobile phone 40 to receive power from the battery 26 of the digital camera 10.

Figure 2:
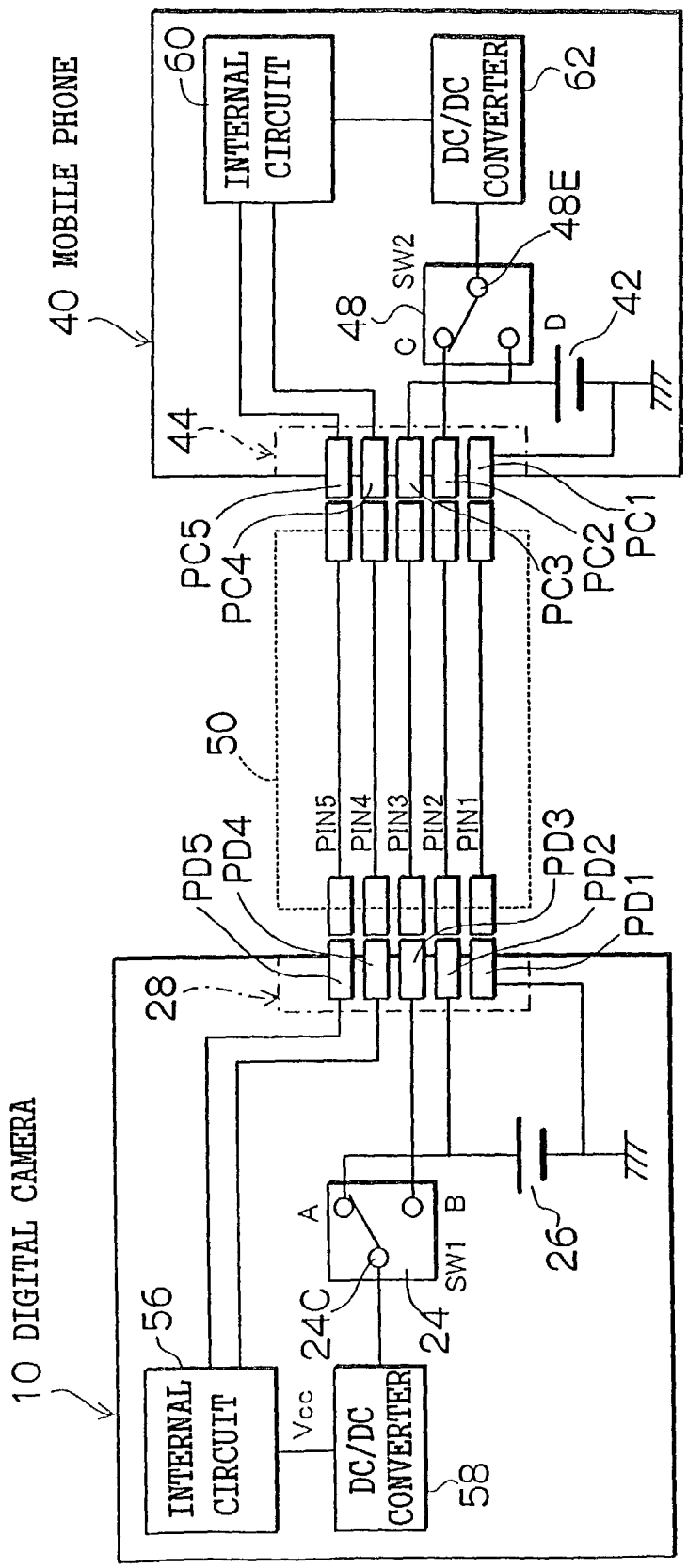
FIG. 2 shows a circuit of essential portions and a connection relationship between the digital camera and the mobile phone.

FIG. 2 shows a circuit of essential portions and a connection relationship between the digital camera 10 and the mobile phone 40. A first pin PD1 of the connector 28 in the digital camera 10 connects to the ground (GND). A second pin PD2 connects to a cathode of the battery 26 and a contact A terminal of the power supply selection switch 24. A third pin PD3 connects to a contact B terminal of the power supply selection switch 24. A fourth pin PD4 and a fifth pin PD5 connect to an internal circuit 56 of the digital camera 10, and are used as data transfer lines. A movable armature terminal 24C of the power supply selection switch 24 connects to a DC/DC converter 58, and a power supply voltage applied to the movable armature terminal 24C is converted to a required voltage by the DC/DC converter 58 and then supplied to the internal circuit 56.

A first pin PC1 of the connector 44 in the mobile phone 40 connects to the ground (GND). A second pin PC2 connects to a contact C terminal of the power supply selection switch 48. A third pin PC3 connects to a cathode of the battery 42 and a contact D terminal of the power supply selection switch 48. A fourth pin PC4 and a fifth pin PC5 connect to an internal circuit 60 of the mobile phone 40, and are used as data transfer lines. A movable armature terminal 48E of the power supply selection switch 48 connects to a DC/DC converter 62, and a power supply voltage applied to the movable armature terminal 48E is converted to a required voltage by the DC/DC converter 62 and then supplied to the internal circuit 60.

The digital camera 10 and the mobile phone 40 are connected using the multi-conductor connection cable 50 to provide connections between the pins with the same numbers. When the power supply selection switch 24 of the digital camera 10 is set to A, and the power supply selection switch 48 of the mobile phone 40 is set to C, power is supplied from the battery 26 of the digital camera 10 to the mobile phone 40. At this time, the battery 42 of the mobile phone 40 is detached.

When the power supply selection switch 24 of the digital camera 10 is set to B, and the power supply selection switch 48 of the mobile phone 40 is set to D, power is supplied from the battery 42 of the mobile phone 40 to the digital camera 10. At this time, the battery 26 of the digital camera 10 is detached.

When the power supply selection switch 24 of the digital camera 10 is set to B, and the power supply selection switch 48 of the mobile phone 40 is set to C, both batteries 26, 42 are detached. When the power supply selection switch 24 of the digital camera 10 is set to A, and the power supply selection switch 48 of the mobile phone 40 is set to D, power of the digital camera 10 is supplied from the battery 26, and power of the mobile phone 40 is supplied from the battery 42.

Thus, any combinations of settings of the power supply selection switches 24, 48 do not cause electrical connection between the batteries 26, 42. If the batteries 26, 42 were electrically connected, a short would be caused with a risk of destruction or fire. To avoid such a risk, it is necessary that any setting states of the power supply selection switches 24, 48 do not cause direct connection between the batteries 26, 42.

In FIGS. 1 and 2, the power supply selection switches 24, 48 are mechanical switches, but instead, switches using a semiconductor may be used. Further, power supplying paths may be switched by setting from the menu screen displayed on the liquid crystal monitor 18 or the liquid crystal display unit 46.

Figure 3:
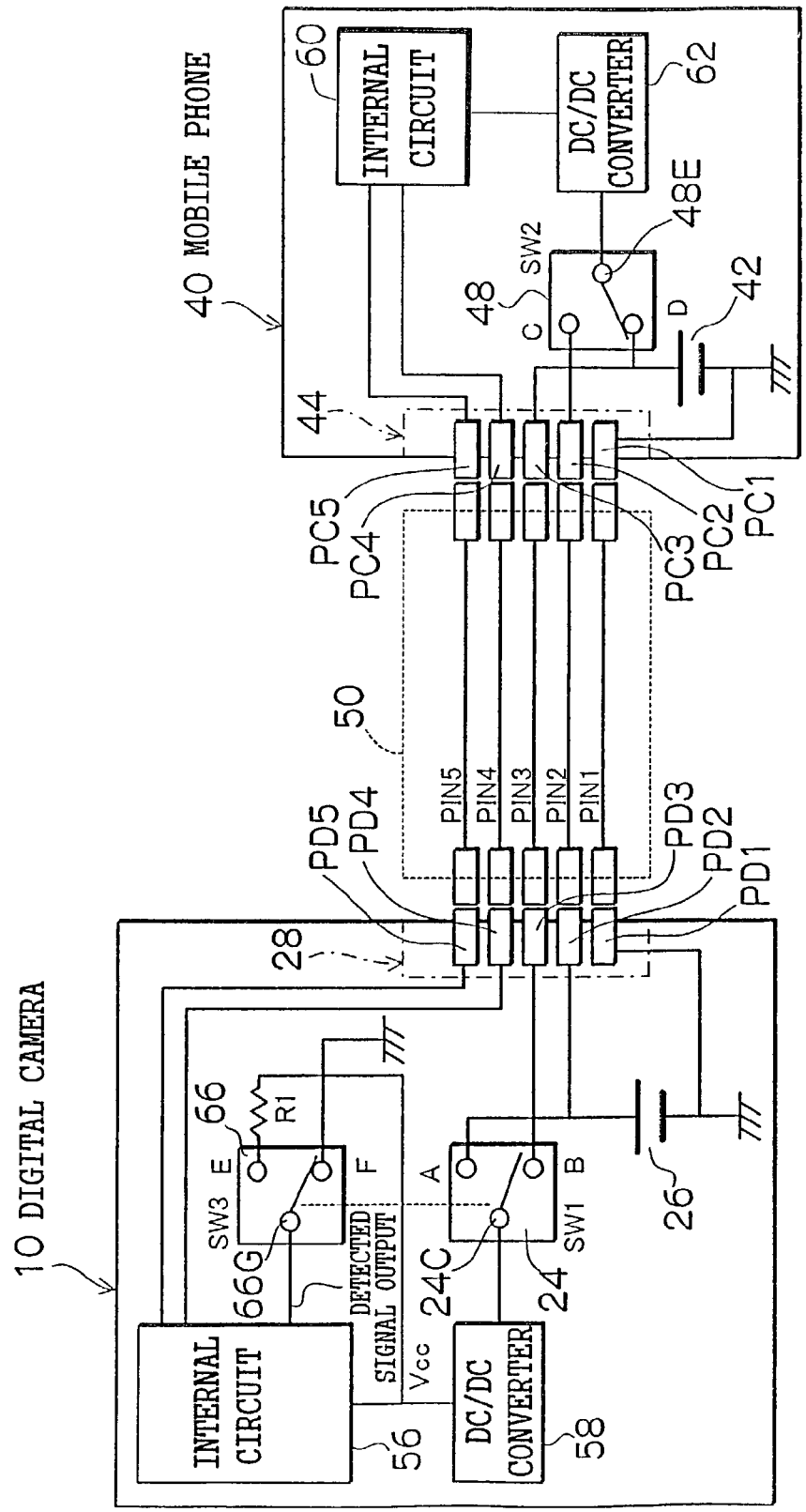
FIG. 3 shows a circuit of essential portions according to another embodiment.

FIG. 3 shows a circuit of essential portions according to another embodiment. In FIG. 3, similar parts as in FIG. 2 are denoted by the same reference numerals, and descriptions thereof are omitted. In FIG. 3, a detection switch 66 (SW3) is added which detects a power supply source in the digital camera 10. The detection switch 66 and the power supply selection switch 24 are interlocking switches, and the detection switch 66 is used for detecting whether the digital camera 10 receives power supplied from an outside (mobile phone 40). One contact E terminal of the detection switch 66 connects to an output terminal of the DC/DC converter 58 via a resistance R1, and the other contact F terminal of the detection switch 66 connects to the ground. When the power supply selection switch 24 is set to B (that is, the digital camera 10 receives the power supplied from the battery 42 of the mobile phone 40), a movable armature of the detection switch 66 contacts the contact F terminal, and a movable armature terminal 66G connects to the ground. Thus, an L (Low) signal as a detected signal is input to the internal circuit 56.

On the other hand, when the power supply selection switch 24 is set to A, the movable armature of the detection switch 66 connects to the contact E terminal, and an output voltage Vcc of the DC/DC converter 58 is applied to the movable armature terminal 66G. Thus, an H (High) signal as a detected signal is input to the internal circuit 56.

The detection switch 66 is provided in order to detect the state where the power is supplied from the mobile phone 40 to the digital camera 10. Generally, power consumption of the digital camera 10 is higher than that of the mobile phone 40, and the battery 26 of the digital camera 10 has a capacity about twice as high as that of the battery 42 of the mobile phone 40. Thus, the state where the power is supplied from the mobile phone 40 to the digital camera 10 places a heavy current load on the battery 42 of the mobile phone 40, causing a problem of significant reduction in a power supply voltage, or the like.

In this embodiment, when the state where the power is supplied from the mobile phone 40 to the digital camera 10 is detected, control is performed to simultaneously operate to reduce the power consumption of the digital camera 10 (move to a lower power consumption mode). For example, (1) an operation of the liquid crystal monitor 18 is stopped (backlight OFF), (2) charging to a flash circuit is stopped, and (3) a clock operation frequency in the camera is reduced. These controls achieve reduction in power consumption.

When the above described state is detected, the data transfer lines (fourth pin and fifth pin) of the connection cable 50 are used to generate a command to reduce power, from the digital camera 10 to the mobile phone 40. The mobile phone 40 receives the command, and is automatically set to a mode of reducing power consumption (low power consumption mode), or controlled to turn off the power supply of the mobile phone 40. Thus, it is preferable to reduce the power consumption of the mobile phone 40 and concentrate the power of the battery 42 on the digital camera 10.

Figure 4:
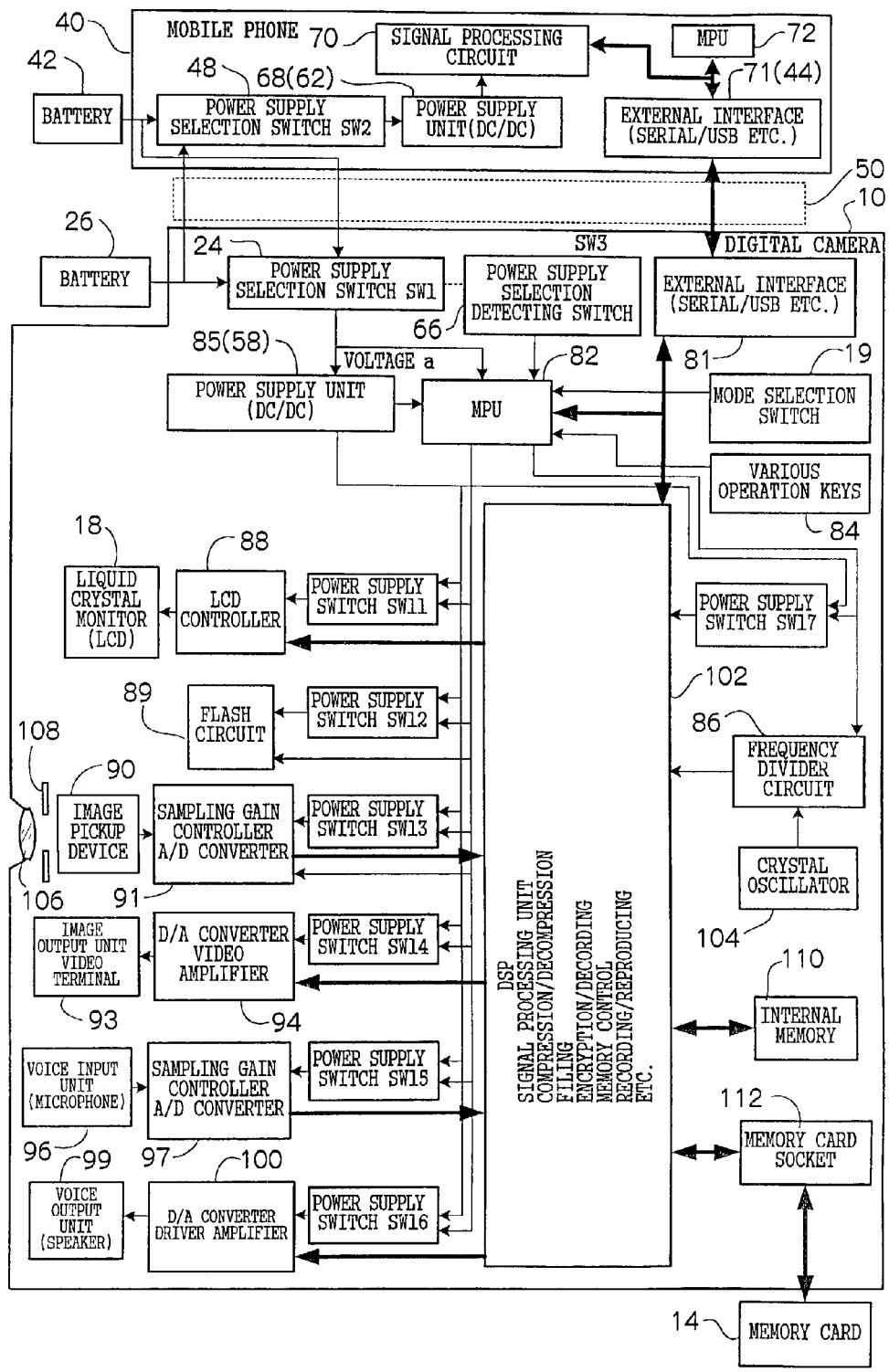
FIG. 4 is a block diagram of internal configurations of the digital camera and the mobile phone shown in FIG. 3.

FIG. 4 is a block diagram of internal configurations of the digital camera 10 and the mobile phone 40 shown in FIG. 3. The battery 42 mounted to the mobile phone 40 connects to the power supply selection switch 48 (SW2), and connects to the power supply selection switch 24 (SW1) of the digital camera 10 via the connection cable 50. Likewise, the battery 26 mounted to the digital camera 10 connects to the power supply selection switch 24, and connects to the power supply selection switch 48 of the mobile phone 40 via the connection cable 50.

As described above, the connections of the batteries 26, 42 as the power supply sources are switched by the power supply selection switches 24, 48. The voltage of the battery 26 or the battery 42 selected by the power supply selection switch 48 of the mobile phone 40 is applied to a power supply unit 68 in the mobile phone 40. The power supply unit 68 is a block including the DC/DC converter 62 illustrated in FIG. 3, and a battery voltage applied to the power supply unit 68 shown in FIG. 4 is converted to a required voltage by the power supply unit 68 and then supplied to a signal processing circuit 70 and other blocks. The signal processing circuit 70 is a circuit block such as a voice signal processing circuit, which performs various processings necessary for the function of the mobile phone.

The mobile phone 40 includes an external interface 71 for communication with the digital camera 10 and other external devices, and a microprocessing unit (MPU) 72 as a control unit.

On the other hand, the digital camera 10 includes an external interface 81 for communication with the mobile phone 40 and other external devices, and a microprocessing unit (MPU) 82 as a camera control unit. The external interfaces 71, 81 correspond to the connectors 44, 28 illustrated in FIG. 1. As the external interfaces 71, 81, various interfaces can be applied such as a serial port, USB, IrDA, IEEE1394, or other serial interfaces or parallel interfaces.

The MPU 82 of the digital camera 10 shown in FIG. 4 controls, based on instruction signals from the mode selection switch 19 and various operating units 84, operations of corresponding circuits, display on the liquid crystal monitor 18, flash firing, auto focus (AF), automatic exposure (AE), image-capturing operation, recording processing, or the like. A block of the operating unit 84 includes various operation keys such as the shutter-release button 12, the cross button 21, the menu/enter button 22, or the cancel button 23 illustrated in FIG. 1.

As shown in FIG. 4, the voltage of the battery 26 or the battery 42 selected by the power supply selection switch 24 of the digital camera 10 is applied to a power supply unit 85 in the camera. The power supply unit 85 is a block including the DC/DC converter 58 illustrated in FIG. 3. The battery voltage applied to the power supply unit 85 shown in FIG. 4 is converted to a required voltage by the power supply unit 85 and then supplied to each circuit block via power supply control switches SW11, SW12, SW13, SW14, SW15, SW16 and SW17 (hereinafter referred to as the power supply control switches SW11 to SW17).

The detected signal of the detection switch 66 interlocked with the power supply selection switch 24 is input to the MPU 82, and the MPU 82 distinguishes between the battery 26 and the battery 42 as the power supply source based on the detected signal received. When detecting the state where the power is supplied from the battery 42 of the mobile phone 40, the MPU 82 monitors a voltage value of the battery 42. Thus, the MPU 82 controls operations of the power supply control switches SW11 to SW17, and a frequency dividing ratio of a frequency divider circuit 86, based on the detected signal from the detection switch 66 and information on the voltage value of the battery 42 (voltage a).

The power supply switch SW11 is a switch for selecting supply or interruption (ON/OFF) of power to display system circuits including the liquid crystal monitor 18 and an LCD controller 88. The power supply switch SW12 is a switch for selecting supply or interruption of power to a flash circuit 89. The flash circuit 89 is a block including a condenser, a charging circuit, a firing control circuit, or the like. The power supply switch SW13 is a switch for selecting supply or interruption of power to image pickup system circuits including an image pickup device 90 and an image pickup signal processing circuit 91. The power supply switch SW14 is a switch for selecting supply or interruption of power to a picture signal generating circuit 94 for outputting a picture signal to an image output unit (video terminal) 93. The power supply switch SW15 is a switch for selecting supply or interruption of power to a voice input unit including a voice input unit (microphone) 96 and a voice signal processing circuit 97. The power supply switch SW16 is a switch for selecting supply or interruption of power to a voice output circuit 100 for outputting voice from a voice output unit (speaker) 99. The power supply switch SW17 is a switch for selecting supply or interruption of power to a digital signal processor (DSP) 102.

The frequency divider circuit 86 is a circuit which switches the frequency dividing ratio to 1/1, 1/2, 1/4, 1/8, 1/16, . . . by a control signal from the MPU 82, and provides the DSP 102 with a clock signal obtained by frequency dividing a clock signal from a crystal oscillator 104 by a designated frequency dividing ratio.

Operations of the digital camera 10 will be outlined below. A light having passed through a taking lens 106 is subjected to light amount adjustment by a shutter and aperture mechanism 108, and then enters the image pickup device 90. As the image pickup device 90, various devices such as a CCD image sensor or a CMOS image sensor can be applied. Many photosensors are arranged on a light-receiving surface of the image pickup device 90 in two dimensions, and a subject image focused on the light-receiving surface is converted to signal charge of amount corresponding to the amount of entering light by each photosensor.

The signal charge accumulated in each photosensor of the image pickup device 90 is successively read out as voltage signals (image signals) in accordance with the signal charge based on pulses provided from an unshown drive circuit, and sent to the image pickup signal processing circuit 91. The image pickup signal processing circuit 91 includes an analog signal processing circuit such as a sampling hold circuit, a color separation circuit, a gain control circuit, and an A/D converter. In the image pickup signal processing circuit 91, the voltage signals are subjected to correlation double sampling (CDS), color separation into color signals of R, G, B, and gain control of a level of each color signal, and then converted to digital signals by the A/D converter.

Digital image signals output from the image pickup signal processing circuit 91 are sent to the DSP 102. The DSP 102 is a signal processing block having image signal processing units such as a luminance/color-difference signal generation circuit, a gamma correction circuit, a sharpness correction circuit, a white balance correction circuit, and various signal processing unit such as a compression/decompression processing unit, a filing processing unit, an encryption/decoding processing unit, a memory control unit, a recording/reproducing processing unit. Image data sent from the image pickup signal processing circuit 91 to the DSP 102 is converted to luminance signals (Y signals) and color-difference signals (Cr, Cb signals) in the DSP 102, and subjected to a predetermined processing such as gamma correction, then stored in an internal memory 110.

When the captured image is to be displayed and output, the image data is read from the internal memory 110, and converted to picture signals in a predetermined display format via the DSP 102. The picture signals thus obtained are output to the liquid crystal monitor 18 via the LCD controller 88. The image data in the internal memory 110 is rewritten at regular intervals by the image signals captured from the image pickup device 90, and the picture signals generated from the image data are fed to the liquid crystal monitor 18, thus causing the liquid crystal monitor 18 to display a captured picture (live image). It is possible to transfer this picture to the mobile phone 40 and display it on the liquid crystal display unit 46 of the mobile phone 40.

Pressing the shutter-release button 12 in the operating unit 84 causes an instruction signal to start image-capturing to be generated. The MPU 82 detects the instruction signal and performs an image pickup operation for recording. Specifically, the MPU 82 performs various calculations such as focus evaluation calculation or AE calculation from the image data captured in response to "half press (S1=ON)" of the shutter-release button 12, controls an unshown lens driving unit based on the calculation results to move the taking lens 106 to a focusing position, while controls the shutter and aperture mechanism 108, and controls charge accumulation time of the image pickup device 90.

The MPU 82 controls the image pickup system circuit in response to receiving the image-capturing start signal by "full press (S2=ON)" of the shutter-release button 12, starts capturing the image data for recording, and sends a command to the compression/decompression circuit in the DSP 102. Thus, the compression/decompression circuit compresses the image data in the internal memory 110 in JPEG or other predetermined formats. The compressed image data is recorded in the memory card 14 mounted to the memory card socket 112.

When a reproduction mode is selected by the mode selection switch 19, the image data is read from the memory card 14, and the read image data is decompressed by the compression/decompression circuit in the DSP 102, then reproduced and output on the liquid crystal monitor 18. It is also possible to transfer the image stored in the memory card 14 to the mobile phone 40, and send it to an outside by an e-mail sending function of the mobile phone 40.

Figure 5:
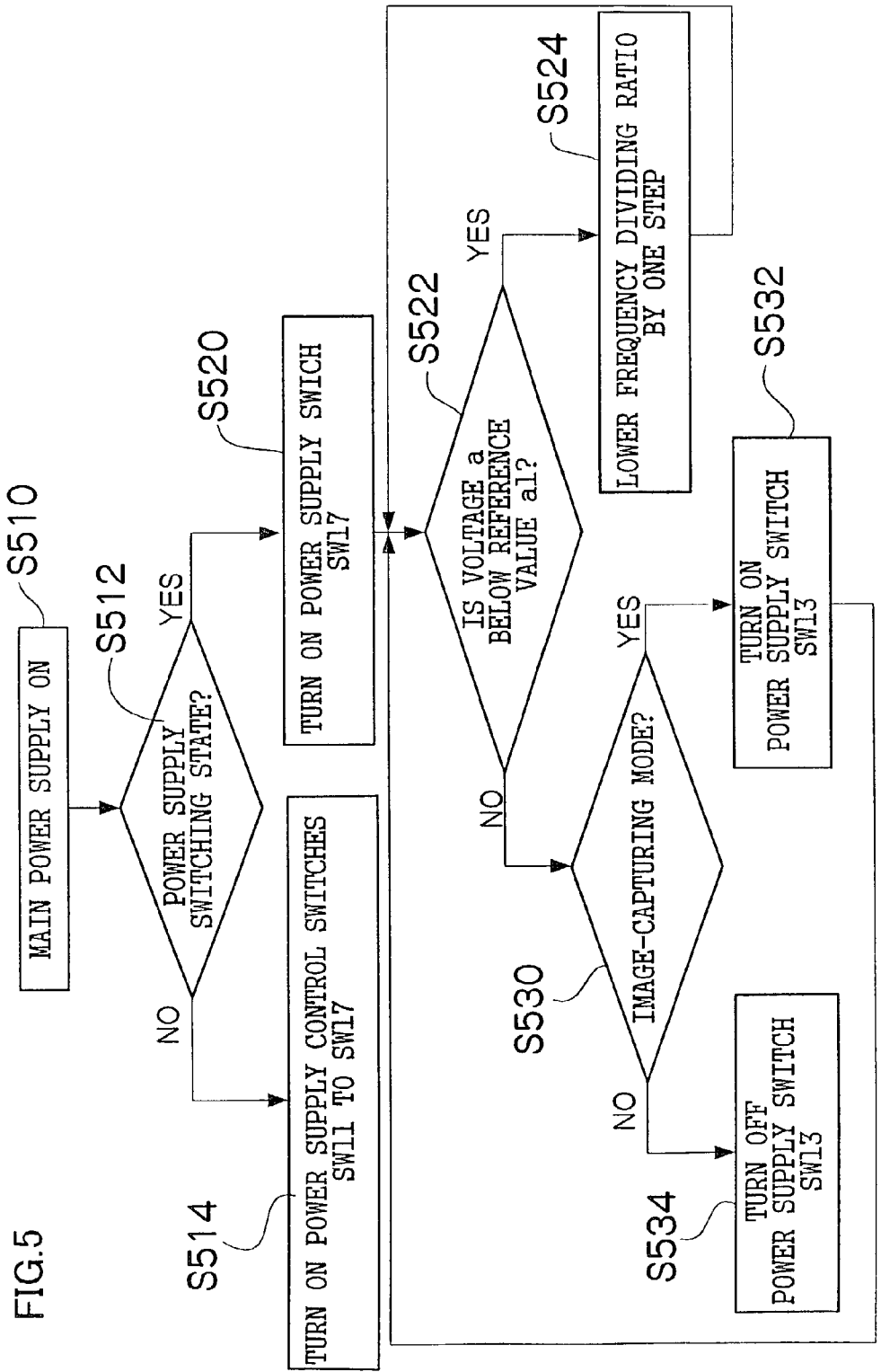
FIG. 5 is a flowchart of a control procedure of the digital camera of this embodiment.

The operations of the digital camera 10 thus configured will be described. FIG. 5 is a flowchart of a control procedure of the digital camera 10 of this embodiment. When the power supply switch 17 of the camera is operated to turn on the power supply (Step S510), the MPU 82 first determines whether the camera is in a power supply switching state (the state where the camera receives the power supplied from the mobile phone 40), based on the detected signal from the detection switch 66 (Step S512). When the power supply source is the battery 26 of the digital camera 10 (when determined NO), the process goes to Step S514, and all the power supply control switches SW11 to SW17 are turned on.

On the other hand, in Step S512, when determined that the camera receives the power supplied from the battery 42 of the mobile phone 40 (when determined YES), the process goes to Step S520. In Step S520, the power supply switch SW17 is turned on and other power supply switches SW11 to SW16 are OFF. Next, the voltage value (voltage a) of the battery 42 is read to determine whether the voltage a is below a determination reference value a1 previously defined (Step S522). The determination reference value a1 is defined as a voltage sufficient to operate the digital camera 10 by supplying power from the battery 42, and set as a lower limit voltage such that the voltage value decreases below the determination reference value a1 to cause irregular operation of the camera.

In Step S522, when determined that the voltage a is below the determination reference value a1 (when determined YES), the process goes to Step S524, and the frequency dividing ratio is lowered by one step, then the process returns to Step 522. Lowering the clock frequency dividing ratio by one step reduces power consumption to increase the voltage a.

In Step S522, when determined that the voltage a is above the determination reference value a1 (when determined NO), the process goes to Step S530. In step S530, it is determined whether the camera is set to the image-capturing mode. This determination is made based on a setting state of the mode selection switch 19. When the image-capturing mode is selected (when determined YES), the power supply switch SW13 is turned on for allowing image-capturing (Step S532).

On the other hand, in Step S530, when determined NO (when the reproduction mode or other operation mode without image-capturing is selected), the power supply switch SW13 is turned off to control to prevent supplying power to the image pickup system circuit (Step S534). After Step S532 or Step S534, the process returns to Step S522. Then, operations of the operation keys are monitored to perform operations in accordance with operation instructions.

The digital camera 10 and the mobile phone 40 according to this embodiment are configured to share both batteries 26, 42, so that even if one battery is drained, power is supplied from the other battery to allow use of the device. This allows the device to be used for longer hours.

Figure 6:
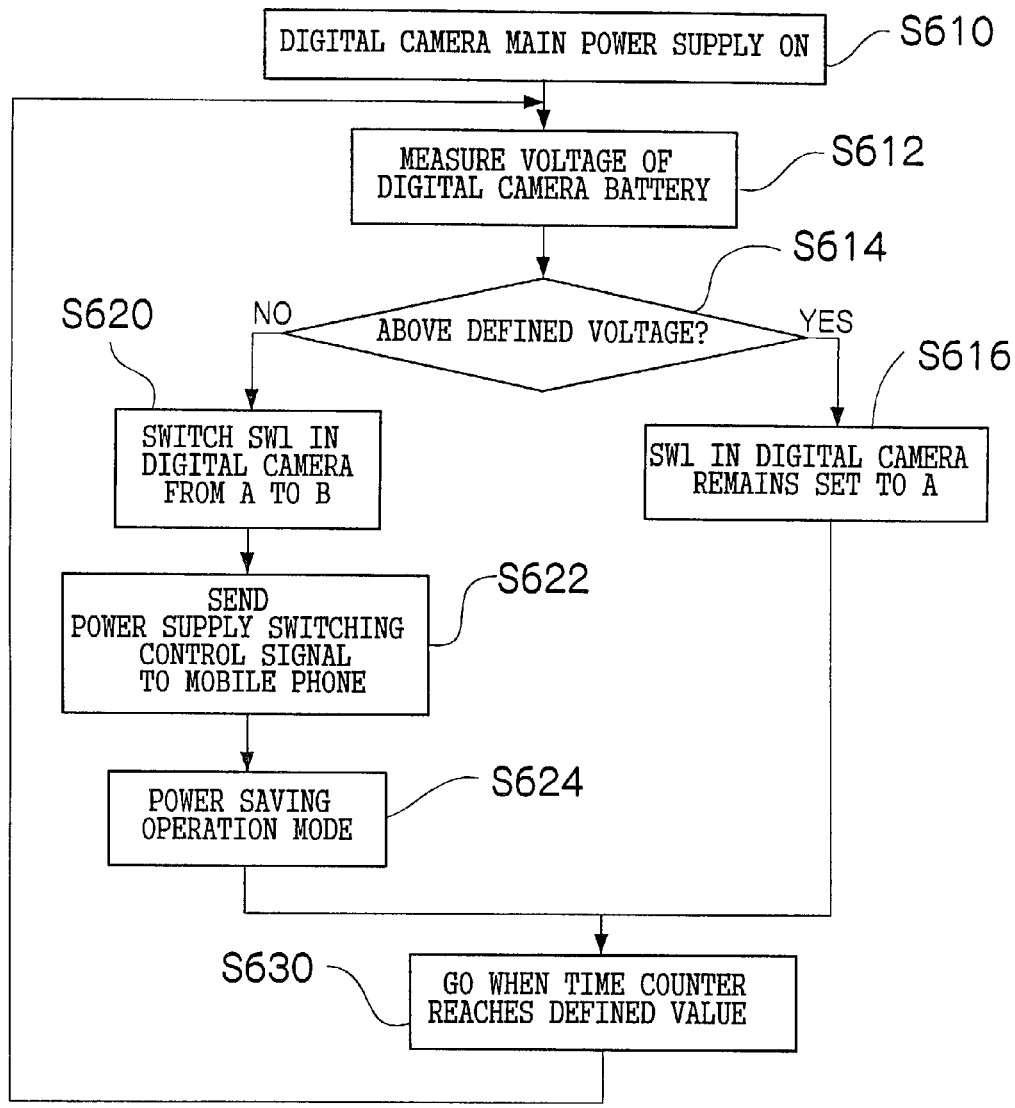
FIG. 6 is a flowchart of a control procedure of automatic switching of power supplies.

The above described power supply selection switches (SW1, SW2) are manually operated by users, but the power supply selection switches may be electronic switches that automatically control switching the power supplies. FIG. 6 shows a control procedure thereof.

After the power supply of the digital camera 10 is turned on (Step S610), the voltage of the battery 26 is input to an A/D conversion port of the MPU 82 and measured (Step S612). It is determined whether the measured voltage value is above the defined voltage (Step S614). If the voltage is above the defined voltage, there is no need to supply power from the outside, so that the power supply selection switch SW1 in the digital camera 10 remains set to A (Step S616).

On the other hand, when the voltage does not reach the defined voltage in Step S614, it is determined that power needs to be supplied from the outside, and the power supply selection switch SW1 is switched to B (Step S620). Then, a control signal indicating a switching state of the power supply (power supply switching control signal) is sent to the mobile phone 40 (Step S622) to enter a power saving operation mode (Step S624). At this time, the MPU 72 of the mobile phone 40 sets the power supply selection switch SW2 to D, and sets the mobile phone 40 to the power saving operation mode, based on the power supply switching control signal sent from the digital camera 10. Thus, the power is supplied from the battery 42 of the mobile phone 40 to the digital camera 10.

After Step S616 or Step S624, the process goes to Step S630. In Step S630, a timer counter is started, and when a count value reaches a defined value, the process returns to step S612. Thus, the above described switching determination processing of the power supply is repeated in a given cycle.

In FIG. 6, the controls of the digital camera 10 are described, but the same applies to the mobile phone 40. The MPU 72 of the mobile phone 40 monitors the voltage of the battery 42, and when determined that the battery 42 does not reach a defined voltage, the MPU 72 switches connection of the power supply selection switch 48 to C, and controls such that the mobile phone 40 receives the power supplied from the battery 26 of the digital camera 10. Then, the MPU 72 sends a control signal indicating a switching state of the power supply (power supply switching control signal) to the digital camera 10.

Figure 7:
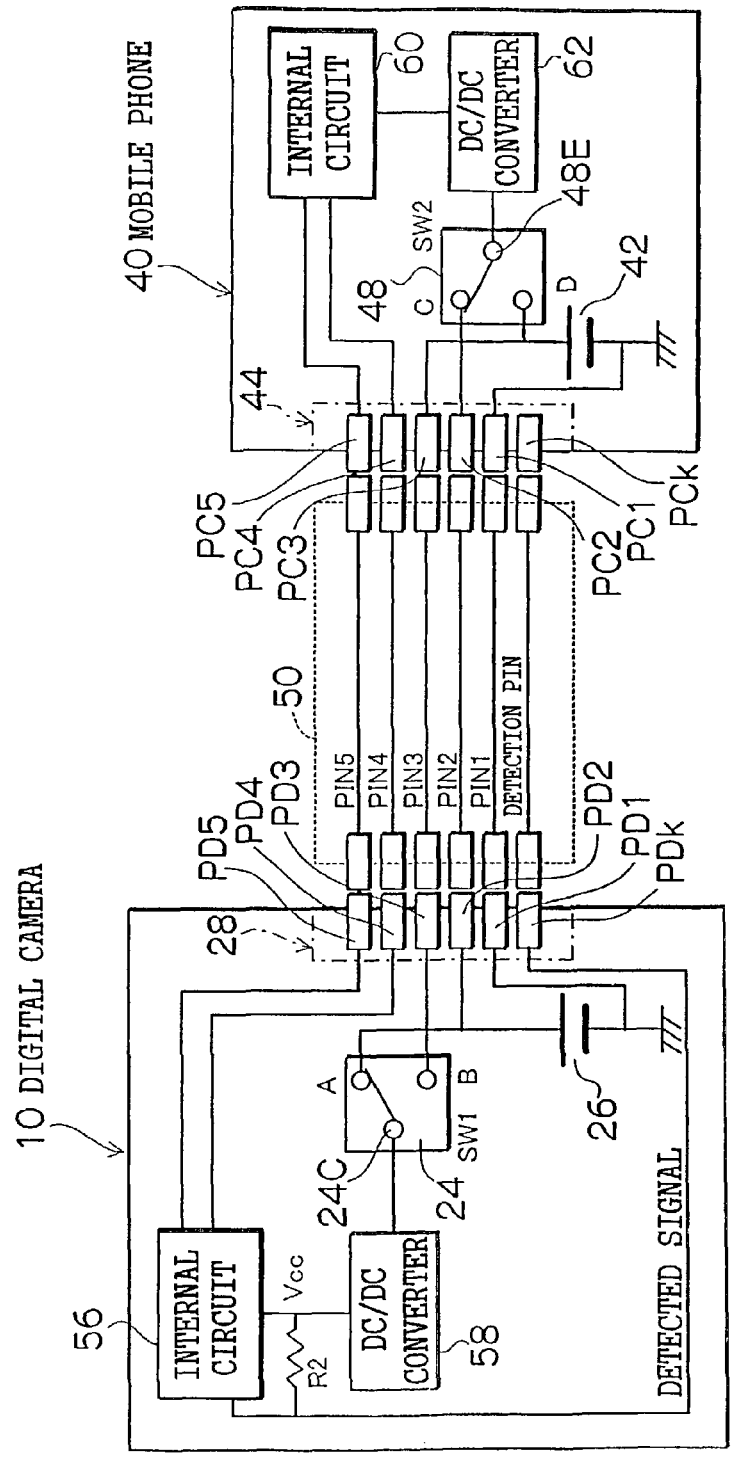
FIG. 7 shows a circuit of essential portions and a state where the mobile phone is connected to the digital camera.
Figure 8:
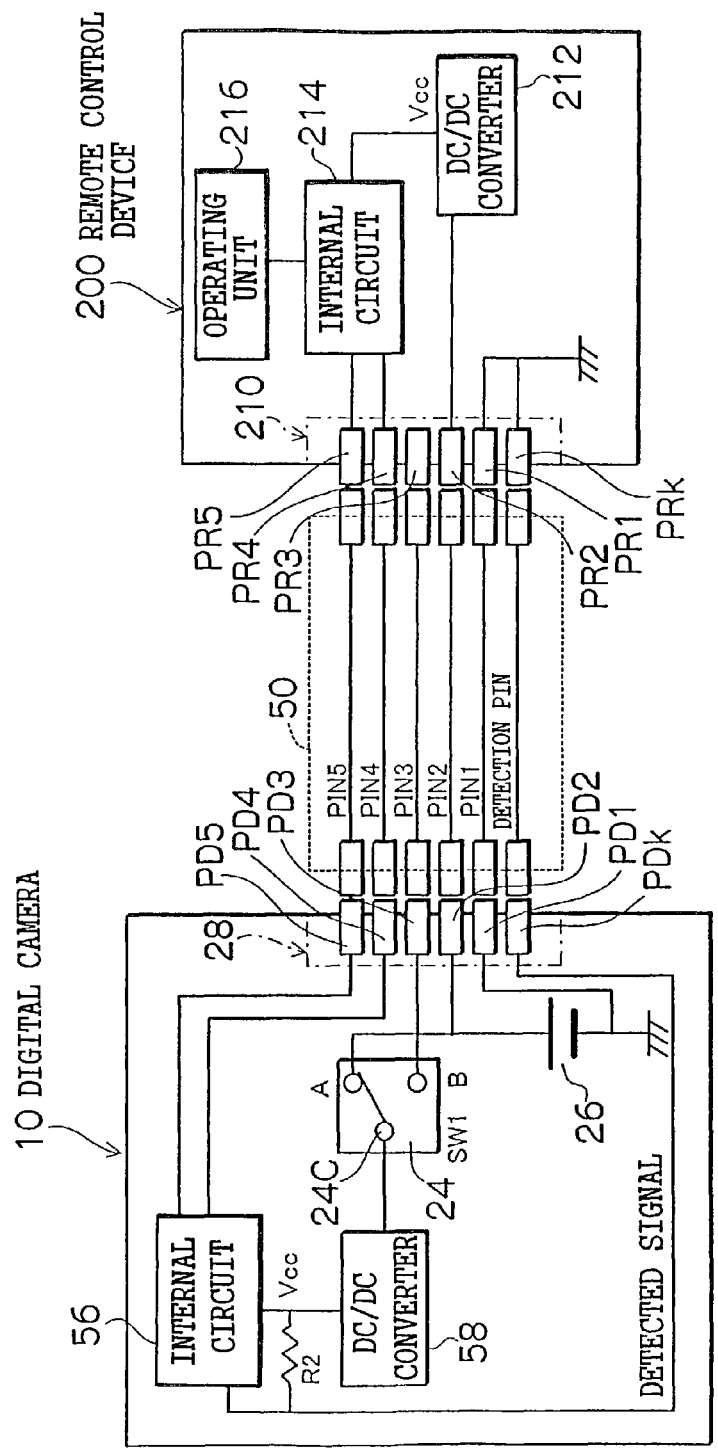
FIG. 8 shows a circuit of essential portions and a state where a remote control device is connected to the digital camera.

Next, a modification of the embodiment will be described. FIGS. 7 and 8 show circuits of essential portions according to another embodiment of the invention. In the drawings, identical or similar parts as in FIG. 2 are denoted by the same reference numerals, and descriptions thereof are omitted. In the embodiment shown in FIGS. 7 and 8, a connector 28 of a digital camera 10 is shared as a connecting unit of a remote control device 200.

As a device which automatically distinguishes between a state where a mobile phone 40 is connected to the digital camera 10 (FIG. 7) and a state where the remote control device 200 is connected to the digital camera 10 (FIG. 8), a detection pin PDk is provided in the connector 28. A detection signal line of the detection pin PDk connects to a Vcc output terminal of a DC/DC converter 58 via a pull-up resistance R2, and a detected signal is input to an internal circuit 56 of the digital camera 10.

A connector 44 of the mobile phone 40 is also provided with a detection pin PCk, and the detection pin PCk has no connection in the mobile phone 40 (non-connected terminal). Thus, when the digital camera 10 and the mobile phone 40 are connected via a connection cable 50 as shown in FIG. 7, the detected signal of the detection pin PDk becomes an "H (high)" signal.

On the other hand, a detection pin PRk provided in a connector 210 of the remote control device 200 shown in FIG. 8 connects to the ground in the remote control device 200. Thus, when the digital camera 10 and the remote control device 200 are connected via the connection cable 50, the detection pin PDk connects to the ground, and the detected signal becomes an "L (low)" signal.

The digital camera 10 determines that the remote control device 200 is connected thereto when the detected signal is "L", while determines that the mobile phone 40 is connected thereto, or that there is no connection, when the detected signal is "H". To distinguish between the connecting state and the non-connecting state of the mobile phone 40, a communication signal is output from the digital camera 10 to distinguish between them according to presence or absence of a reply.

A first pin PR1 of the connector 210 in the remote control device 200 connects to the ground (GND) together with the detection pin PRk. A second pin PR2 corresponds to a power input terminal, and connects to a DC/DC converter 212 in the remote control device 200. A third pin PR3 is a non-connected terminal. A fourth pin PR4 and the fifth pin PR5 connect to an internal circuit 214 and are used as data transfer lines.

A power supply voltage applied to the second pin PR2 is converted to a required voltage by the DC/DC converter 212 and then supplied to the internal circuit 214. When an operating unit 216 provided in the remote control device 200 is operated, a command signal in accordance with the operation is transferred to the digital camera 10 via the data transfer lines (fourth pin and fifth pin). The digital camera 10 operates in accordance with the command signal received from the remote control device 200. This achieves remote control of the digital camera 10 using the remote control device.

As described above, according to the invention, the digital camera connectable to the mobile electronic device can receive the power necessary to operate the camera from the battery of the external mobile electronic device to be connected, so that even if the battery of the digital camera is drained, switching to the battery of the electronic device allows the digital camera to be used for longer hours.

According to another aspect of the invention, the power can be supplied from the battery of the digital camera to the external mobile electronic device, so that even if the battery of the mobile electronic device is drained, switching to the battery of the digital camera allows the mobile electronic device to be used for longer hours.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera connectable to a mobile electronic communication device capable of being driven by a battery, the digital camera comprising:
    a first battery which provides a supply source of power necessary to operate the digital camera;
    a connecting unit which electrically connects to the mobile electronic communication device;
    a power input terminal which receives power supplied from a second battery mounted in the mobile electronic communication device connected via the connecting unit;
    a power supply selection device which selectively switches a power supply such that power is supplied from one of the first battery and the second battery;
    a power output terminal capable of supplying power from the first battery to the mobile communication electronic device connected via the connecting unit;
    a detecting device which detects the power supply selected by the power supply selection device; and
    a control device which operates to reduce power consumption of the digital camera when the detecting device detects a state where the power is supplied from the second battery to the digital camera,
    wherein as the operation to reduce the power consumption of the digital camera, the control device performs operations comprising stopping supplying power to an image display device, stopping supplying power to a flash circuit, and reducing a clock operation frequency,
    wherein the digital camera is a stand-alone digital camera.

2. The digital camera according to claim 1, wherein the control device supplies power to an image pickup circuit system only when the detecting device detects the state where the power is supplied from the second battery to the digital camera and the digital camera is set to an image-capturing mode.

3. The digital camera according to claim 1, further comprising a communication device which sends power supply switching information to the mobile electronic communication device when the detecting device detects the state where the power is supplied from the second battery to the digital camera.

4. The digital camera according to claim 3, further comprising:
a battery remaining amount determining device which determines remaining amount of the first battery; and
a power supply switching control device which automatically controls switching the first power supply selection device such that power is supplied from the second battery when the battery remaining amount determining device determines that the remaining amount of the first battery is below a predetermined reference value.

5. The digital camera according to claim 1, further comprising:
a battery remaining amount determining device which determines remaining amount of the first battery; and
a power supply switching control device which automatically controls switching the first power supply selection device such that power is supplied from the second battery when the battery remaining amount determining device determines that the remaining amount of the first battery is below a predetermined reference value.

6. The claim has been rejoined.

7. A digital camera system capable of transferring image data by connecting a mobile electronic communication device capable of being driven by a battery and a digital camera, wherein:
the digital camera comprises:
a first battery which provides a supply source of power necessary to operate the digital camera;
a first connecting unit which electrically connects to the mobile electronic communication device;
a first power input terminal which receives power supplied from a second battery mounted in the mobile electronic communication device connected via the first connecting unit;
a first power supply selection device which selectively switches a power supply such that power is supplied from one of the first battery and the second battery;
a first power output terminal capable of supplying power from the first battery to the mobile electronic communication device connected via the first connecting unit;
a detecting device which detects the power supply selected by the first power supply selection device;
a first control device which operates to reduce power consumption of the digital camera when the detecting device detects a state where the power is supplied from the second battery to the digital camera; and
a communication device which sends power supply switching information to the mobile electronic communication device when the detecting device detects the state where the power is supplied from the second battery to the digital camera; and
the mobile electronic communication device comprises:
a second battery which provides a supply source of power necessary to operate the mobile electronic communication device;
a second connecting unit which electrically connects to the digital camera;
a second power input terminal which receives power supplied from the first battery mounted in the digital camera connected via the second connecting unit;
a second power supply selection device which selectively switches a power supply such that power is supplied from one of the first battery and the second battery;
a second power output terminal capable of supplying power from the second battery to the digital camera connected via the second connecting unit;
a second control device which operates to reduce power consumption of the mobile electronic communication device based on the power supply switching information sent from the digital camera; and
the first connecting unit and the second connecting unit are used so that the first power input terminal and the second power output terminal are connected and the first power output terminal and the second power input terminal are connected to allow power to be supplied between the digital camera and the mobile electronic communication device,
wherein as the operation to reduce the power consumption of the digital camera, the control device performs operations comprising stopping supplying power to an image display device, stopping supplying power to a flash circuit, and reducing a clock operation frequency,
wherein the digital camera is a stand-alone digital camera.

8. The digital camera system according to claim 7, wherein a circuit is configured such that the first battery and the second battery are not electrically connected to each other in any setting states of the first power supply selection device and the second power supply selection device.

9. The digital camera system according to claim 7, wherein the mobile electronic communication device comprises a mobile telephone.

10. The digital camera system according to claim 7, wherein the mobile electronic communication device further comprises a DC-DC converter.

11. The digital camera system according to claim 7, wherein the digital camera further comprises a DC-DC converter.

* * * * *